United States Patent [19]

Marcovici

[11] 4,411,166
[45] Oct. 25, 1983

[54] PRECISE LINEAR ACTUATOR

[75] Inventor: Mitch Marcovici, Murray Hill, N.J.

[73] Assignee: Keuffel & Esser Company, Morristown, N.J.

[21] Appl. No.: 244,444

[22] Filed: Mar. 16, 1981

[51] Int. Cl.³ .................... F16H 25/08; F16H 25/18
[52] U.S. Cl. .................................... 74/89; 74/25; 74/209
[58] Field of Search ............... 74/25, 89, 202, 206, 74/209; 104/166

[56] References Cited

U.S. PATENT DOCUMENTS

| 2,204,638 | 6/1940 | Weathers | 74/25 |
| 3,272,021 | 9/1966 | Weber | 74/25 |
| 3,777,578 | 12/1973 | Swanberg | 74/89 |
| 3,926,062 | 12/1975 | Neff | 74/89 |
| 4,246,802 | 1/1981 | Rasmussen et al. | 74/25 |

Primary Examiner—Lawrence J. Staab
Attorney, Agent, or Firm—Lionel N. White

[57] ABSTRACT

A linear actuator mechanism which comprises skewed roller members arranged about a drive shaft and translates rotation of the drive shaft to linear displacement along the shaft includes a pair of body members having a ball joint between them which serves as a pivot about which adjustable spring compression constrains each of the three normal degrees of freedom in the body member pair to provide a kinematic union which eliminates indiscriminate displacement between the actuator mechanism and the drive shaft.

5 Claims, 3 Drawing Figures

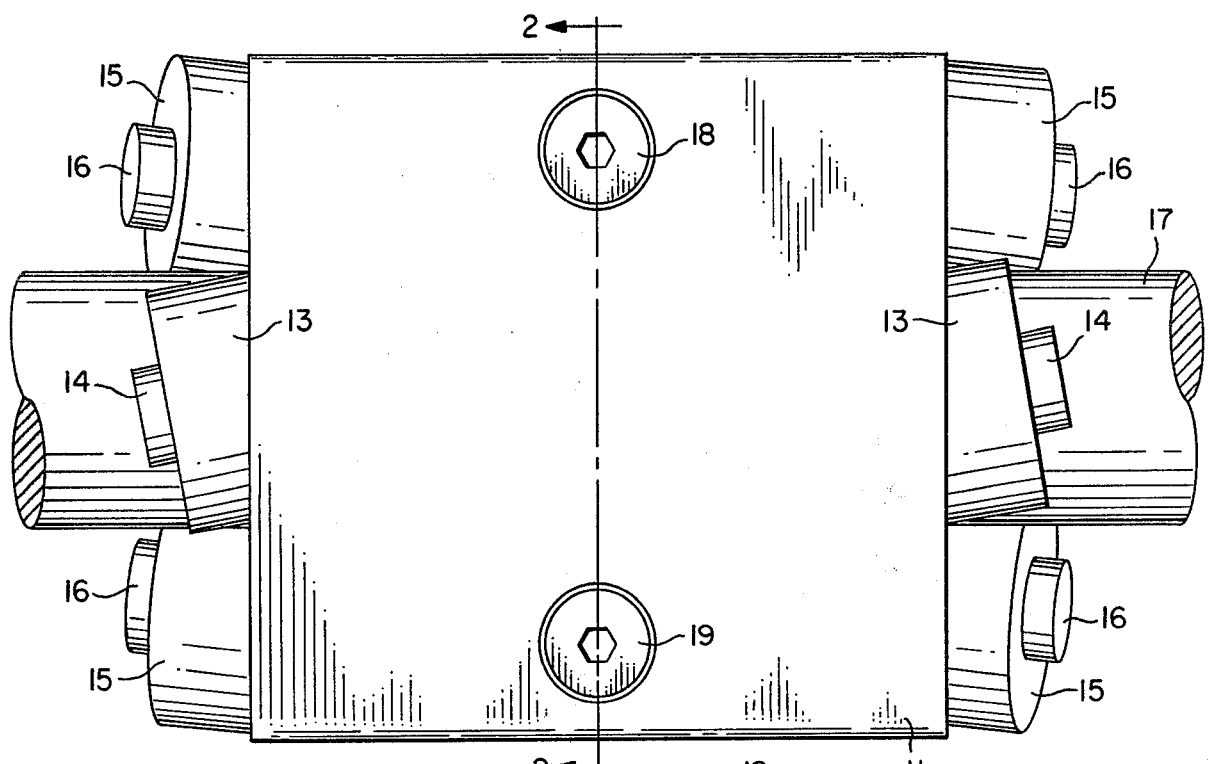
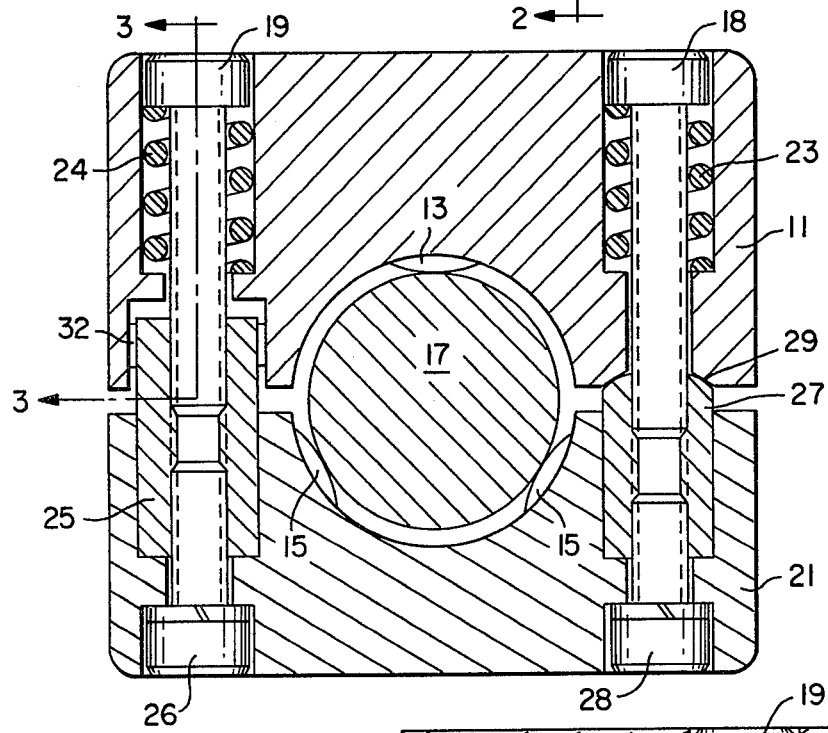
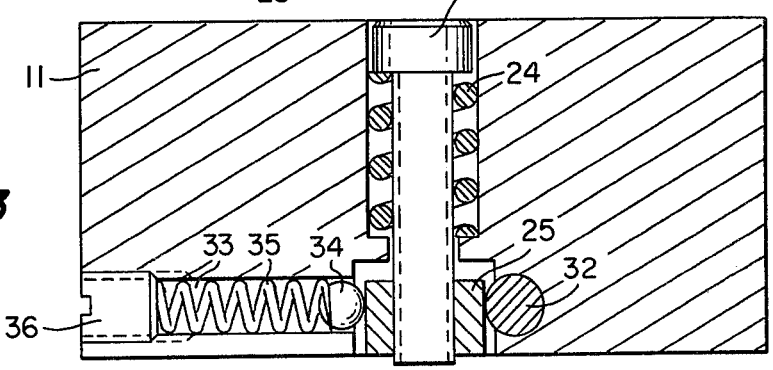
FIG. 1
FIG. 2
FIG. 3

PRECISE LINEAR ACTUATOR

BACKGROUND

The present invention relates to a type of mechanism, variously referred to as a linear actuator or thrust converter, by means of which the rotation of a drive shaft may be translated to linear displacement along the axis of the shaft. This mechanism generally comprises a pair of body members on which are journaled a plurality of roller members which are in rolling contact with the surface of the drive shaft when the body members are joined to substantially encompass the shaft.

The motion translation effect of the mechanism derives from the fact that the roller members are mounted on the body in such a manner that their axes of rotation are set at an angle with respect to the axis of rotation of the shaft, resulting in their describing a helical path of rolling contact upon the circumference of the drive shaft. The rate of advancement, or pitch, of the mechanism in response to drive shaft rotation is dependent upon the angle between the axes of the roller members and that of the drive shaft.

A unique feature of the linear actuator type mechanism, of which a number of embodiments and applications have been described in U.S. Pat. No. 2,204,638, U.S. Pat. No. 2,382,105, and U.S. Pat. No. 3,272,021, is the capability of varying the amount of linear thrust developed during operation as a result of changes in contact pressure between the rollers and the surface of the drive shaft. This variation in pressure is normally accomplished by means of one or more bolts or screws which increase or decrease the compression of springs urging the body members toward one another and the rollers against the shaft.

As a consequence of the nature of this adjustment feature which requires substantial tolerances between the body members and the adjustment elements, the linear actuator has suffered from a significant amount of lost motion or "backlash" between the actuator mechanism and the drive shaft. Although this deficiency is relatively unimportant in applications involving coarse motion, such as in door closures, the indiscriminate displacement resulting from current designs and constructions is totally unacceptable in precise instrumentation, such as coordinate measuring tables.

It is to such latter applications where a high degree of precision and elimination of indiscriminate displacement are required that the advantages of the present invention are directed. As a result of the improved structure of this invention, the thrust-adjusting capabilities and other desirable characteristics of the linear actuator are retained, yet there is provided a kinematic union between the pair of body members which adjustably constrains displacement between them in each of the three orthogonal planes to thereby eliminate intolerable backlash.

SUMMARY

In the means for joining the linear actuator body members which comprises the present improvement there is provided a ball joint between the members which, located on one side of the drive shaft, establishes a point of reference with respect to the constraints which will limit displacement between the body members in each of the three planes, or degrees of freedom, which tolerances within the mechanism structure usually allow.

On the opposite side of the drive shaft from the ball joint there is provided the usual spring-loaded screw advancing means which urges the body members together about the shaft-parallel axis of the ball joint to thereby effect the desired amount of pressure between the roller members and the surface of the drive shaft. This adjustment means provides the limitation of the first degree of freedom which may be viewed, with respect to the drive shaft axis, as "roll".

Constraint upon the second degree of freedom, which may be viewed as "pitch", is imparted by means of the distribution of roller/shaft contact points substantially evenly about the circumference of the shaft and on both sides of the shaft-transverse plane on which lies the reference flexure point established by the ball joint.

In addition to these displacement constraints, the present invention provides a third, stabilizing constraint which enables utilization of the present actuator mechanism in precision tools. To this end there is provided in each of the mechanism body members a fixed contact point situated on a line which is substantially parallel to the axis of the drive shaft. Additional means urge the body members in opposite directions about the vertical axis of the ball joint so as to bring together and retain these points in firm contact, thereby restricting indiscriminate "yaw" displacement between the body members.

DRAWINGS

In the accompanying drawings:

FIG. 1 is a top plan view of a linear actuator of the present invention in normal operating engagement with a drive shaft;

FIG. 2 is an elevation view, taken in section at 2—2 of FIG. 1; and

FIG. 3 is an elevation view, taken at 3—3 of FIG. 2, showing functional elements of the actuator of the present invention.

DESCRIPTION

As seen in the drawings, the actuator of the present invention comprises a pair of body members 11, 21 on which are mounted, respectively, rollers 13 and 15, 15. The respective journal shafts 14, 16 of these roller members are oriented at an angle to the axis of drive shaft 17 in order to provide the desired longitudinal displacement upon rotation of the drive shaft. As can further be seen these roller members are distributed in a regular manner about the circumference of drive shaft 17 and are arranged in two sets which are longitudinally offset on opposite sides of the median drive shaft-transverse plane of the mechanism in order to provide stability with respect to the shaft.

Actuator body members 11, 21, as seen in FIG. 2, substantially encompass drive shaft 17 and are joined together about shaft 17 by means of bolts 18, 19. The pressure with which rollers 13, 15 are brought into contact with the circumference of shaft 17, and consequently the maximum thrust to be derived in the actuator mechanism, is determined by the extent to which springs 23, 24 are compressed by the advancement of bolts 18, 19 during assembly of the mechanism about shaft 17.

A novel element of the present mechanism may be seen in FIG. 2 as spherical surface 29 which in combination with the matching conical depression in body member 11 forms a ball-socket joint which acts as a pivot or reference point about which the imposed freedom-constraining forces act to effect the kinematic union between body members 11, 21. In the present embodiment spherical surface 29 is formed at one end of a cylindrical insert 27 which is received in an appropriate bore in body member 21 and firmly retained in place by means of bolt 28 in the threaded longitudinal bore of insert 27. The same threaded bore is used to receive and permit the adjustment of bolt 18.

A second bore in body member 21 is located at the opposite side of drive shaft 17 and receives a cylindrical insert 25 which is firmly affixed to body member 21 by means of bolt 26 in the longitudinal threaded bore of insert 25. This threaded bore also receives adjusting bolt 19 by means of which body member 11 is rotated about the horizontal shaft-parallel axis of the ball joint pivot, thus closing the mechanism assembly about shaft 17 and bringing rollers 13, 15 into tighter contact with the surface of shaft 17, the degree of pressure being determined by the compression of spring 24. The original freedom of body member 11 to "roll" with respect to the axis of drive shaft 17 is thus yieldably constrained by the urging of springs 23, 24.

Likewise responding to the reaction of springs 23, 24 body member 11 pivots about the drive shaft-transverse axis of the ball joint until rollers 13, 13 are brought into contact with the surface of shaft 17 under equal amounts of pressure determined by the compression of springs 23, 24. The relative "pitch" freedom between the body members 11, 21 is thus yieldably constrained under the urging of springs 23, 24.

Finally, the original "yaw" freedom is constrained by urging means of which an embodiment is shown more particularly in FIG. 3. A contact surface is provided on body member 11 and situated closely adjacent to and disposed in the longitudinal direction from a matching contact surface on body member 21 so that contact points on these surfaces establish a line substantially parallel to the axis of shaft 17. In the present embodiment cylindrical insert 25 is employed as the contact surface of body member 21 while a pin 32 pressed into a transverse bore in body member 11 provides the matching contact surface. The respective points of tangency between insert 25 and pin 32, which may be of material such as steel for purposes of resisting wear, constitute the two contact points of body members 21, 11. As an alternative to stationary pin 32, the lead end of a bolt threadedly engaged in body member 11 may serve as an adjustable contact point.

Opposite insert 25 along the shaft parallel line through the point of contact with pin 32 there extends through body element 11 a bore in which is received a contact element, such as ball 34, and compression spring 35 acting between element 34 and a bore closing element such as set screw 36. The reaction of spring 35, which may be varied by means of set screw 36, results in a pivoting of body member 11 with respect to body member 21 about the vertical ball joint axis thereby effecting the yaw-constraining contact between insert 25 and pin 32 under the yieldable urging of compression spring 35.

In the foregoing manner the kinematic union between body members 11, 21, and between the resulting roller mechanism and drive shaft 17 is established which eliminates "backlash", lost motion, or other indiscriminate displacement of the actuator mechanism with respect to drive shaft 17. Any tendency for indiscriminate displacement which might otherwise be introduced by bearing play in the roller members themselves can of course readily be eliminated by means of bearing preload during assembly of the mechanism, or through the use of commercially available duplex bearings which are manufactured with a built-in preload. The resulting linear actuator mechanism may be employed to great advantage in precise measuring equipment such as coordinate measuring tables, or photogrammetric stereoplotters and graphic compilers.

What is claimed is:

1. In a mechanism for converting rotation of a drive shaft into linear displacement along the axis of said shaft; which mechanism comprises a pair of body members joined to substantially encompass the circumference of said shaft, and a plurality of roller members mounted on said body members and distributed regularly about said shaft circumference in rolling surface contact therewith, the axes of said roller members being disposed at an angle to said shaft axis to thereby cause said roller members to follow helical paths along the shaft surface during contacting rotation therewith resulting in displacement of said mechanism along said shaft axis; the improvement in means for joining said body members which eliminates indiscriminate displacement of said mechanism with respect to said shaft, said improvement comprising:
    (a) means situated on one side of said shaft forming a ball joint between said body members;
    (b) means urging said body members into contact at said ball joint;
    (c) first means situated on the opposite side of said shaft for urging said body members about the horizontal, shaft-parallel axis of said ball joint toward contact at said opposite side, thereby urging said roller members into contact with said shaft; and
    (d) second means situated on said opposite side of said shaft for urging said body members about the vertical axis of said ball joint toward contact at said opposite side.

2. The improvement according to claim 1 wherein said ball joint is formed of a cylindrical element affixed to one of said body members and presenting a spherical end, and a depression in the other of said body members for receiving said spherical end.

3. The improvement according to claim 2 wherein said means urging contact at said ball joint comprises threaded shaft means extending axially from said cylindrical element spherical end and adjustably compressing spring means against said other body member in the direction of said ball joint.

4. The improvement according to claim 2 wherein said first urging means comprises threaded shaft means affixed to one of said body members extending therefrom substantially parallel to the axis of said ball joint cylindrical element and adjustably compressing spring means against the other of said body members in the direction of said one body member.

5. The improvement according to claim 1 which includes a chamber in one of said body members, a bore in said one body member extending substantially parallel to said drive shaft and communicating between said chamber and the exterior of said one body member, and an element of the other of said body members extending into said chamber, and wherein said second urging means comprises spring means within said bore and screw means threadedly engaging the exterior portion of said bore and adjustably compressing said spring means against said other body member element, thereby urging said element toward contact with a portion of the wall of said chamber.

* * * * *